Patented Feb. 21, 1933

1,898,427

UNITED STATES PATENT OFFICE

FERDINAND DE PAPE, OF UCCLE, BELGIUM, ASSIGNOR TO LA SOUDURE ELECTRIQUE AUTOGÈNE, SOCIÉTÉ ANONYME, OF BRUSSELS, BELGIUM

SALINE COATINGS AND PROCESS OF MAKING THE SAME

No Drawing. Original application filed November 12, 1928, Serial No. 319,023, now Patent No. 1,888,453, dated November 22, 1932, and in France June 26, 1928. Divided and this application filed September 18, 1930. Serial No. 482,916.

This invention relates to a process of making saline compositions suitable for use as a welding flux and intended to form the flux coatings of welding rods and of electrodes used for welding non-ferrous metals by the electric arc.

This application is a division of applicant's previously filed application, Serial No. 319,023, since matured into Patent No. 1,888,453, dated November 22, 1932.

In the metallurgy of metals other than iron and, in particular, in the metallurgy and the welding operations carried out by means of the gas blow pipe, of the light metals such as aluminium, it is known to use essentially saline products as a flux. These saline products generally consists of halogenated compounds of alkaline earth metals and other metallic salts soluble in water. Powdered saline materials are also known for welding copper and its alloys.

For various chemical and physico-chemical reasons (for instance, the destructive action of salts on organic binders, and the difference in the solubility coefficients of the salts, respectively), it was not possible to supply suitable saline mixtures in a colloidal, plastic or viscous form, enabling a paste or coating to be obtained which was capable of being applied to, and of drying on, the parts to be welded (in the case of butt-welding) or on weld sticks and electrodes used in arc-welding.

The present invention renders it possible commercially to make saline welding compositions capable of being applied as a coating on the parts to be welded or, as a covering, on weld sticks or electrodes used in the electric welding of non-ferrous metals such as aluminium, copper and their alloys.

From a physical standpoint, the new welding compositions of the invention consist essentially of a mixture of salts, partly in suspension and partly in solution, and an inorganic compound in a gelatinous form capable of binding the said mixture as a protective colloid and agglutinating the salts when the composition is dried.

The process of making the composition according to the invention comprises, in principle, decomposing an inorganic gelatinizing compound in solution by means of crystalloids (salts or their acids or bases) which enter into the composition and separating out one of its ionic constituents in a gelatinous form, and combining or fixing the decomposition product by a peptizing treatment. In the description which follows, the term "crystalloids" is intended to cover salts, their acids and their bases, in accordance with the general theories of colloidal chemistry.

In the case of a silicious compound, the silica forming the gel or gelatinous precipitate can be separated out either in free form or in combined form, depending on the character or the nature of the silicious compound and the crystalloids used. Thus, for example, in carrying out the process, a silicious compound in solution ($H_2SiF_6$ for instance) can give a precipitate in the form of a gel by the action of the crystalloids (neutral salts, for instance, $NaCl$) introduced, and the resulting reaction mixture of acid character can subsequently be subjected to a peptizing treatment in which the acid components are combined.

Or else, the silica forming one of the ionic constituents of the silicious compound used in solution can be separated out in the same way in gel form by the action of crystalloids (bases for example, or basic salts) which combine either wholly or partly with the other constituent in solution. Peptizing can take place simultaneously, or subsequently by adding a further amount of the crystalloid used or of equivalent reagents.

Finally, the decomposition product may be that of a partial or complete double-decomposition, because a true solution of a silicious compound separates out one of its constituents, that is to say, the silica, in the form of a gelatinous precipitate by combining with the constituents of opposite sign of the crystalloids employed; the other ionic constituents liberated in the decomposition mixture then being combined in the subsequent peptizing treatment.

Usually, the peptizing operation consists in adding to the decomposition mixture, which reacts acid, a base or a salt thereof. In accordance with the general theory of colloidal chemistry, the peptizing causes a change of condition in which the gel or gelatinous precipitate is again brought wholly or partly to the hydrosol state, to produce the improved composition, the physical character of which has been defined above.

As the added peptizing agent generally comprises an agent for neutralizing the decomposition mixture, it follows that in carrying out the present process one or more salts are produced in situ and thus incorporated in the composition of the invention. But the peptizing cannot be considered as a neutralizing treatment because the phenomena of adsorption inherent in colloidal media are able to keep an acid and a base present without their acting immediately upon each other to effect mutual neutralization.

By selecting a suitable compound for forming the gel or gelatinous precipitate, as well as the crystalloids for either decomposition or peptization, or both, and by applying certain properties of the peptized system which are explained in the course of the description which follows, it is possible to prepare in definite form (i. e., in the form of a paste, a coating capable of drying and adhering) any given composition.

Examples of the processes according to the invention are given below.

*Example 1*

250 cc. of hydrofluosilicic acid ($H_2SiF_6$) of specific gravity 1.3 diluted with 150 cc. of water are decomposed in a mortar with a mixture of 300 gr. of sodium chloride and 450 gr. of potassium chloride finely divided. During grinding, 150 gr. of lithium chloride dissolved in 200 cc. of water are also added. After being allowed to stand for one hour the acid reaction mixture is peptized by slowly adding, with stirring, 220–250 cc. of caustic potash of specific gravity 36° Bé.

The peptization may be controlled in known manner by the determination of the pH value. The peptization gives rise to a colloidal system in which the coagulated or precipitated constituent plays the part of a protective colloid for saline particles which are dispersed in a medium formed by water or an aqueous saline solution. The peptized mixture may, if desired, be passed through a colloid mill.

The coating thus prepared may be rendered more fluid by addition of water. Furthermore, it has been found that when the peptization has been suitably effected, the colloidal system is sufficiently stable to allow of incorporating therein one or more other crystalloids in aqueous solution. Moreover, after peptization, it is possible, according to the invention, to incorporate, in the colloidal system formed, one or more crystalloidal salts, soluble or slightly soluble in water, in the solid state, by grinding. According to this particular feature of the invention, it is possible, for example, to incorporate in the coating easily decomposable salts without decomposing them, whose properties it is desired to preserve in the dried coating.

*Example 2*

100 gr. of dry ground sodium sulphite, which is easily incorporated in the colloidal system without decomposition, are added to the peptized mixture obtained according to Example 1, and for the purpose of slowing down or regulating the fusion of the dried coating, 50–100 gr. of an inert substance, for example, silicious earth, are also finally added with a sufficient quantity of water to form a suitably fluid paste, which is employed to coat, for instance by dipping, rods or wires of aluminium or aluminium alloys.

Modifications in the methods of carrying out the invention are possible. Thus, for example, in producing a coating for aluminium alloy electrodes, as in Example 1, it is not always necessary to add after peptization an easily-decomposable salt, as in Example 2, as this decomposable salt may be replaced for instance by a stable salt, for example an alkaline sulphate or a sulphate of a polyvalent metal which, for instance, is added in the decomposition or reaction step.

The invention may also be carried out with other inorganic gelatinizing compounds liable to be decomposed into a gelatinous constituent and another ionic constituent, the latter being subsequently combined, such as, for example, water-soluble fluosilicates.

By the term "inorganic gelatinizing compound" as used in the description is meant an inorganic compound which is capable by the action of an electrolyte, for instance, such compounds as fluosilicic acid ($H_2SiF_6$), water soluble fluosilicates, etc., to separate out one of its constituents in the form of a gel or precipitate.

Any suitable water soluble salt, other than those used for the decomposition itself, can be added, either in the decomposition stage or, even after the peptization stage, by subsequent absorption, as described. It is also possible to add to the peptized composition, or in the course of production thereof, known adjuvants, for example oxides, alkaline-earth or insoluble metallic carbonates, combustible substances such as carbon, or metallic substances or the like intended, for example, to increase the refractory properties of the coating, to determine its melting point or to cause different effects in the arc or in the formation of the welding slag.

By "crystalloid" as used in the process is meant a water soluble inorganic salt or compound used for such a decomposition by a chemical reaction. Such crystalloids are often different for the different metals used as the core of an electrode. Different salts have been proposed in various patents as additions to coating which are not substantially "saline" coatings, as is the case in the present application.

Welding electrodes or rods which have been coated with the peptized compositions are preferably dried in air at temperatures about 80–100° C.

The flux coatings obtained according to the invention, for instance those prepared as described in Examples 1 or 2, may also be used on the articles which are to be welded (e. g., by butt-welding) or soldered.

In U. S. Patent No. 372,696 (Middleton), the use of a solution of sodium silicate as a fluxing agent is described. In U. S. Patent No. 1,663,004 (Green), use is made of simple mixtures of an organic binder and a material such as a solution of sodium aluminate and metallic oxides. Finally, in U. S. Patent No. 1,752,793 (Hammers), use is made, for a coating, of a mixture of feldspar and oxide of iron held in suspension in a sodium silicate solution. I am aware of the existence of these patents and I do not claim anything described therein.

The process of my invention supplies suitable substantial saline coatings in a homogeneous plastic or viscous form, in which the water soluble saline particles are perfectly bound together without the help of any exterior binder, the paste being not simply a mixture of silicate of sodium or other inorganic binder in which salts are held in suspension.

What I claim is:—

1. A method of making welding flux composition in the form of a paste containing water soluble flux forming compounds, to form a dry coating for welding rods and electrodes used for arc welding, comprising reacting on said water soluble flux forming compounds with a fluosilicic acid solution to produce a saline precipitate and adding a compound having a basic reaction to chemically combine with the reaction mixture and to disperse the same.

2. A method of making welding compositions in the form of a paste containing water soluble fluxing compounds, suitable to form the flux coating of welding rods and of electrodes, comprising the steps of grinding water soluble fluxing salts which enter into the flux forming coating with a fluosilicic acid ($H_2SiF_6$) solution, adding to the reaction mixture which contains a saline precipitate an alkali, which chemically combines with the free acid of said mixture and at the same time disperses (physically) said precipitate.

3. In a method of the character described in claim 1, the addition of salts in aqueous solution to the resulting saline paste formed by the composition.

4. In a method of the character described in claim 2, the addition of salts in aqueous solution to the resulting saline paste formed by the composition.

5. In a method of the character described in claim 1, the addition of water soluble salts in solid form to the resulting saline paste formed by the composition.

6. In a method of the character described in claim 2, the addition of water soluble salts in solid form to the resulting saline paste formed by the composition.

7. In a method of the character described in claim 1, the addition to the resulting saline composition of refractory insoluble compounds which remain chemically inert in the formation of the composition and modify the properties of said composition.

8. In a method of the character described in claim 2, the addition to the resulting saline composition of refractory insoluble compounds which remain chemically inert in the formation of the composition and modify the properties of said composition.

In testimony whereof I affix my signature.

FERDINAND DE PAPE.